United States Patent

Miyazawa et al.

[11] Patent Number: 6,038,531
[45] Date of Patent: Mar. 14, 2000

[54] SIMILAR WORD DISCRIMINATION METHOD AND ITS APPARATUS

[75] Inventors: Yasunaga Miyazawa; Hiroshi Hasegawa; Mitsuhiro Inazumi; Tadashi Aizawa, all of Suwa, Japan

[73] Assignee: Seiko Epson Corporation, Tokyo, Japan

[21] Appl. No.: 09/010,621

[22] Filed: Jan. 22, 1998

[30] Foreign Application Priority Data

Jan. 30, 1997 [JP] Japan .................................. 9-017205

[51] Int. Cl.[7] .................................................. G10L 9/06
[52] U.S. Cl. ........................................... 704/232; 704/255
[58] Field of Search .................................. 704/232, 256, 704/231, 241, 236, 255

[56] References Cited

U.S. PATENT DOCUMENTS

| | | | |
|---|---|---|---|
| 5,345,536 | 9/1994 | Hoshimi et al. | 395/2.52 |
| 5,457,768 | 10/1995 | Tsuboi et al. | 395/2.4 |
| 5,761,639 | 6/1998 | Takebayashi et al. | 704/253 |
| 5,794,204 | 8/1998 | Miyazawa et al. | 704/275 |
| 5,796,863 | 8/1998 | Lyon | 382/157 |
| 5,805,730 | 9/1998 | Yaeger et al. | 382/228 |
| 5,805,731 | 9/1998 | Yaeger et al. | 382/228 |
| 5,832,430 | 11/1998 | Lleida et al. | 704/256 |
| 5,899,972 | 5/1999 | Miyazawa et al. | 704/249 |
| 5,903,884 | 5/1999 | Lyon et al. | 706/25 |

FOREIGN PATENT DOCUMENTS

| | | | |
|---|---|---|---|
| 6-4079 | 1/1994 | Japan | G06G 7/60 |
| 6-119476 | 4/1994 | Japan | G10H 7/08 |

OTHER PUBLICATIONS

ICASSP 93., Alvarez–Cardillo et al, "Context Modelling Using RNN for Keyword Detection", p. 569–72, vol. 1 of 5 vol. Apr. 1993.

EUROSPEECH 91. Wittenburg et al., "Recurrent Neural Nets as Building Blocks for Human Word Recognition", p. 015–18 vol. 2 of 4. Sep. 1991.

*Primary Examiner*—Richemond Dorvil
*Attorney, Agent, or Firm*—Oliff & Berridge, PLC

[57] ABSTRACT

A method is provided which performs word recognition using the dynamic recurrent neural networks (DRNN) model and which is able to discriminate, with high precision, similar words for which misrecognition often occurs. When the vocal sounds of some words are input, the DRNN output corresponding to the input word vocal data is generated by the word detection signal output component using the DRNN word model and encoded into coded data by using a code book. When the DRNN output from the word detection signal output component has a correctness of a predetermined or greater level, a processor establishes a fixed period that includes the characteristic components of the input words in the DRNN output. The processor then examines the code data in the established fixed period. Discrimination of input words and words that are similar to the input words is accomplished on the basis of the examination results.

33 Claims, 8 Drawing Sheets

SIMILAR WORD DISCRIMINATION METHOD AND ITS APPARATUS

BACKGROUND OF THE INVENTION

1. Field of Invention

The present invention relates to a similar word discrimination method that discriminates pronunciation and a similar word discrimination word apparatus. In particular, it relates to a similar word discrimination method and apparatus in voice recognition technology that use the dynamic recurrent neural networks (DRNN) word model as one of the voice recognition technologies for unspecified speakers.

2. Descritption of Related Art

Voice recognition technology exists which uses the DRNN voice model as the voice recognition technology for unspecified speakers. Applicants have described using the voice recognition technology accomplished using DRNN as disclosed in Japanese Laid Open Patent Application Nos. 6-4079 and 6-119476, as described below.

With the DRNN voice model, a characteristic vector series of some words is input as time series data. Then, in order to obtain an appropriate output for the words, there is a build up between each unit in accordance with a pre-leaming precedent, and a bias is respectively determined. As a result, an output is obtained that is close to the taught output for the words, in relation to spoken voice data of non-specified speakers.

For example, the time series data of the characteristic vector series of the word "ohayo—good morning" of some unspecified speaker is input. In order to obtain an output that is close to the taught output that is ideally output for the word "ohayo—good morning", data for each respective two dimensions of the characteristic vector of the word "ohayo—good morning" are applied to the corresponding input unit, and converted by the established buildup on the learning precedent and bias. Then, time series processing is accomplished for each of the characteristic vector series of some input single word as the time series data. Thus, output that is close to the taught output for the word is obtained for the voice data spoken by some non-specified speaker.

With regard to the DRNN voice model prepared for all of the words that should be recognized, the leaming precedent which changes the buildup to obtain an appropriate output for the respective words is recorded from pages 17–24 of the communications sounds technological report of the electronic information communications association publication "Technical Report of IEICI sp 92–125 (1993-01)."

A simple explanation is provided with reference to FIGS. 7a–7c concerning voice recognition that uses the learning DRNN voice model with regard to some predetermined words.

With the voice recognition technology accomplished by the DRNN format, certain common keywords are preprogrammed (for example, "ohayo—good morning", "tenki—weather", etc.). These key words are recognized subject words from within continuous speech. (For example, "ohayo, ii tenki desu ne—good morning, it's good weather isn't it?") These key words receive a value that shows the level of correctness that exists in the components of the input voice. On the basis of the value that shows the level of correctness, understanding of the continuous speech is accomplished.

For example, if the speaker making the input says, "ohayo, ii tenki desu ne—Good morning. It's nice weather, isn't it?", then a speech signal such as that shown in FIG. 7(a) is output. For this type of speech signal, an output is obtained such as that shown in FIG. 7(b) for the speech signal components "ohayo—good morning". In addition, an output is obtained such as that shown in FIG. 7(c) for the speech signal component "tenki—weather". In FIGS. 7(b) and (c), the numerical values 0.9 and 0.8 are numerical values that show the level of correctness (similarity) between the inputted words and the preregistered key words. If the numerical value is as high as 0.9 or 0.8, then the words of the vocal input have a high level of correctness. In other words, as shown in FIG. 7(b), the registered word "ohayo—good morning" exists with a level of correctness of 0.9 as component W1 on the time axis of the input voice signal. The registered word "tenki—weather", as shown in FIG. 7(c), exists with a level of correctness of 0.8 as component W2 on the time axis of the input voice signal.

Thus, recognition of the voice input can be accomplished using the DRNN word model by creating a DRNN word model for each respective word that becomes the subject of recognition.

Therefore, in the case when a DRNN word model is created for multiple words, learning can be accomplished by speaking a recognition subject word and another word together.

For example, as shown in FIG. 8, word 2 is the subject of recognition and word 1 is not. The output does not rise for the voice data of word 1, but learning is accomplished in that the output rises for the voice data of word 2 which occurs subsequently. If the chronology was reversed, the output is increased for the voice data of word 2, and the output declines for the subsequent continuing voice data of word 1.

Learning is accomplished in this manner by the DRNN word model. However, the problem with the voice recognition process that uses the DRNN word model created by this type of learning is that if words are spoken that are similar to the words that are the subject of recognition, a DRNN output will be made that has a certain level of correctness, even if the spoken words are not the subject recognition word.

This accomplishes learning at the time of learning the DRNN word model applied to the continuous two word voice data, described above. Ordinarily, learning is not accomplished at this time among the words having similar pronunciation. For example, in consider the words "nanji—what time" and "nando—what degree", that have similar sounds (referred to as similar words) At the time of creating the voice model relating to "nanji—what time", if there is continuity between the sound data "nanji—what time" and the sound data "nando—what degree", then the output increases for the vocal data of "nanji—what time" and for the similar "nando—what degree". In order to distinguish between these two similar words, the word discrimination method must create a contradiction in the learning of the components that are part of the same vocal sound series of the two words that are part of the same sound "nan—what".

In the case where the learning DRNN word "nanji—what time is it" is the recognition subject word and where the spoken input of a speaker is "nando—what degree is it", there are many situations where the DRNN output for the spoken word "nando—what degree is it" is determined to be "nanji—what time is it".

In addition, there are situations where the user may want to add the recognition capability of the word "nando—what degree is it" to the word "nanji—what time is it" that has been pre-recorded as the learning recognition subject word. In order to be able to accurately recognize a similar word, there is a need for a simple word discrimination process.

SUMMARY OF THE INVENTION

Therefore, in order to make the accurate recognition of similar words possible, it is an object of the present invention to discriminate similar words simply and with high precision by using the current voice model without changing the learning method of the existing DRNN voice model itself.

In order to achieve this objective, the first embodiment of the present invention is provided with a learning voice model to obtain the specified output that shows the level of correctness in reaction to the vocal data of some words. The similar word recognition method accomplishes recognition of similar words that have the possibility of being misrecognized, at the time of recognition processing, on the basis of the output relating to input words using the voice model, when some words are vocally input. In the case that an output is made that shows the level of correctness at a predetermined or greater level by the voice model in reaction to the vocal data of the input words, a period is established which includes characteristic components of words that are input into its output. Examination is made of the characteristics of the vocal data of the input words during the specified period and discrimination is accomplished between the input word and words resembling the input word.

A learning DRNN voice model is provided to obtain the specified output that shows the level of correctness in reaction to the vocal data of some words. At the time of recognition processing, the DRNN vocal model is used with a similar word discrimination method that discriminates similar words having the possibility of being misrecognized on the basis of the DRNN output for input words. In addition to printing out the DRNN output corresponding to the input word voice data using the DRNN voice model at the time of making a vocal input of several words, encoding of data is accomplished for the input word voice data, using a code book. If the DRNN output that is produced has a correctness of a predetermined or greater level for the input words, a specified period is established that includes the characteristic components of the words that are input in the DRNN output. The code data is examined during the established specified period, and the input words and the words that are similar to the input words are discriminated.

In one preferred embodiment of the invention, the code data is examined for the vowels from among the code data and the specified established period. The input words and words that are similar to the input words are discriminated depending upon the vowels. In this situation, the code book is created from five vowels.

In addition, the DRNN voice model can be performed for a group of words having similar word groups by examining each similar word. In the respective similar word groups, a learning voice model is provided to obtain the DRNN output that shows the level of correctness of a predetermined or greater level for all of the words in the group.

As one of the methods for discriminating similar words with the present invention, vector quantization is accomplished of input voice data that uses a code book. The code data is obtained and an examination is made as to what kind of vowels exist during the specified period of the DRNN output in order to discriminate the input words. Thus, for similar words for which discrimination cannot be accomplished only by the DRNN output, it is possible to discriminate similar words with a high degree of precision, using the existing DRNN model as it is, without changing the DRNN voice model learning method. In addition, processing can be greatly simplified by the code book generated from five vowels.

Another embodiment of the invention is provided with a learning DRNN voice model in order to obtain a specified output that shows the correctness in reacting to the voice data of some words and with a similar word discrimination method that obtains DRNN output for the input words using the DRNN voice model. Discrimination is accomplished at the time of recognition processing of similar words that have the possibility of being misrecognized on the basis of the output. Voice data is obtained from pronouncing the respective words by multiple speakers. The respective similar words that have the possibility of being misrecognized are encoded using a specified code book. Using encoded code data, a code histogram is created for a specified period that includes the characteristic components of the words relating to each word. The histogram data for each word is preserved as the standard histogram data. When voice input is made of some words, the DRNN voice model is used to output the DRNN corresponding to the input words. The input word voice data is converted to encoded data using a specified code book. In the case of outputting the DRNN that shows the correctness of a predetermined level or greater for the input words, a specified period is established that includes the characteristic components of the words input into the DRNN output. Using the code data, a code histogram is created in a specified period. Comparing the code histogram with the standard histogram data, the input words and the words that are similar to the input words are discriminated. Following the standardization of the respective histogram data, the differential between the code histogram and standard histogram data is computed. The input words and the words that resemble the input words are discriminated by the size of the differential.

Thus, the method for discriminating similar words based on the histogram data and the standard histogram data created from the input words is effective with regard to similar words that could not be discriminated by using the only DRNN output. Without changing the learning method of the DRNN voice model, and using the existing DRNN model, it is possible to accomplish discrimination of similar words with a high level of correctness. Furthermore, with the present invention, since a comparison is made between the number of distributions of the code data of the specified period that includes the characteristic components of words and the number of distributions of standard speech, further discrimination becomes possible with high precision, even with regard to similar words that can easily be misrecognized.

The DRNN voice model is also effective for groups of words having similar word groups by examining each similar word. In the respective similar word groups, learning voice data is used to obtain the DRNN output that manifests the correctness of a predetermined level or greater for all of the words within a group.

Furthermore, a learning DRNN voice model is provided to obtain the specified output that represents correctness when reacting to the voice data of some words. The DRNN output is obtained for the input words using the DRNN voice data model. At the time of recognition processing by a similar word discrimination method that discriminates similar words having the possibility of being misrecognized on the basis of the output, creation is accomplished of a learning DRNN sub-voice model to obtain the DRNN output that shows the correctness of a predetermined level or greater for the characteristic components for respective similar words that have a possibility of being misrecognized. When some words are vocally input and the DRNN output shows the correctness of a predetermined level or greater for the input words, a specified period is established that includes the characteristic components of the words in the DRNN output. An examination is made of the DRNN output state by the DRNN sub-voice model within the specified period. On the basis of the examination results, the input words and the words that are similar to the input words are discriminated.

Discrimination is accomplished of input words and words that are similar to the input words with a DRNN output of a predetermined or greater level, in accordance with the DRNN sub-voice model.

Thus, the method for discriminating similar words using the DRNN sub voice model can accurately discriminate similar words for which discrimination cannot be accomplished only by the DRNN output, without changing the learning method of the existing DRNN voice model. Furthermore, since a determination is made from the DRNN output using the DRNN voice model of only the characteristics among the similar words, further discrimination becomes possible with high precision, even with regard to similar words that can be easily misrecognized.

Also, the DRNN voice model is a learning voice model that is effective for groups of words having similar word groups by examining each similar word. Thus, the DRNN output can be obtained that shows the correctness of a predetermined level or greater for all of the words in the group, in the respective similar word groups.

As indicated above, an explanation has been provided with regard to three different methods. However, processing is simple with any of these systems, and discrimination can be accurately accomplished of the similar words without changing the learning method of the existing DRNN voice model. In addition, with the DRNN voice model, correspondence is established in group divided similar word groups for each similar word. Through the execution of a learning voice model to obtain the DRNN output that shows the correctness of a predetermined level or greater for all of the words within the similar word groups, the need to create a voice model for the similar words disappears one by one. Thus, it proves to be superior from a cost standpoint.

In addition, the similar word discrimination apparatus of the present invention is provided with a learning voice model to obtain the specified output that shows the correctness in reaction to the vocal data of some words. The similar word discrimination apparatus uses the voice model to discriminate similar words that have the possibility of being misrecognized on the basis of the output obtained relating to the input words. The apparatus is provided with a word detection signal output means, the output of that shows the correctness of a predetermined level or greater by the voice model when reacting to the voice data of the input words. A recognition process means is provided that, in the case where the DRNN output from the word detection signal output means has a correctness of a predetermined or greater level, establishes a specified period that includes the characteristic components of the input words. An examination is made of the characteristics of the voice data of the input words during the specified period, and the input words and words that are similar to input words are discriminated on the basis of the examination results.

In addition, a learning DRNN voice model is provided to obtain a specified output that shows the correctness when reacting to the voice data of some words. With a similar word discrimination apparatus, at the time of recognition processing, similar words that have the possibility of being misrecognized are discriminated on the basis of the output obtained from the DRNN output relating to the input words using the DRNN voice model. A word detection signal output means is provided that utilizes the DRNN model and generates the DRNN output corresponding to the input word voice data. A codification means uses a code book to create code data using the input word voice data. A recognition processing means that establishes a specified period that includes the characteristic components of the words input into the DRNN output. Then, the code data is examined and the input words and words that are similar to the input words are discriminated on the basis of the examination results.

In a preferred embodiment of the invention, the code data is examined corresponding to the vowels from among the code data during the established specified period, and the input words and the words that are similar to the input words are discriminated in accordance with the vowels. The code book is created from five vowels.

In addition, the DRNN voice model is a learning voice model that can be performed for a group of words having similar word groups by examining each of the similar words. In the respective similar word groups, the DRNN output is obtained that shows the correctness of a predetermined level or greater for the words in the group.

The similar word discrimination apparatus according the present invention vector quantizes the input voice data using the code book, thereby obtaining the code data. The apparatus examines what type of vowels exist during the specified period of the DRNN output and discriminates the input words. By this apparatus, similar words that cannot be discriminated by using only the DRNN output can now be discriminated with a high level of correctness, using the existing DRNN model as it is without changing the learning method of the DRNN voice model. In addition, establishing of the code book created from the five vowels, processing can be greatly simplified.

In addition. a learning DRNN voice model is provided to obtain a specified output that shows the correctness when reacting to the voice data of some words. With the similar word discrimination apparatus, at the time of recognition processing, discrimination of similar words that have the possibility of being misrecognized is accomplished on the basis of the output obtained from the DRNN output relating to the input words using the DRNN voice model. A standard histogram data storage means is provided that preserves the code histogram created using the code data during the specified period as standard histogram data. This includes the characteristic components of the words from among the code data that encodes the voice data obtained from the speech of multiple speakers for the respective similar words that have the possibility of being misrecognized. A word detection signal output means outputs the DRNN voice model corresponding to the input word voice data at the time of the voice input of some words. A codification means encodes the input word voice data using a specified code book. A recognition processing means is provided that, in the case where the DRNN output from the word detection signal output means shows the correctness of a predetermined or greater level, establishes a specified period that includes the characteristic components of the words input into the DRNN output. Thus, creation is accomplished of a code histogram within the specified period using the code data encoded by the codification means. A recognition processing means discriminates input words and words that are similar to the input words by comparing the histogram data with standard histogram data. Following the standardization of the respective histograms, the differential of both are taken. Discrimination is accomplished of the input word and the words that are similar to the input word based on the magnitude of the differential.

The similar word discrimination apparatus that discriminates similar words from the histogram data created on the basis of the input word data and the standard histogram data makes possible the discrimination of similar words, that cannot be discriminated by using only the DRNN output, with high precision. The apparatus uses the existing DRNN model in its existent state, without changing the learning method of the DRNN model. Furthermore, with the present invention, since a comparison is made between the number of distributions of the specified period code data that includes the characteristic components of the words and the number of distributions of the standard speech, further discrimination with high precision becomes possible. Even with regard to similar words that are easily misrecognized, discrimination is possible with high precision.

The DRNN voice model can be performed for a group of words having similar word groups by examining each similar word. In the respective similar word groups, a learning voice model is created so that the DRNN output can be obtained that represents the correctness of a predetermined or greater level for all of the words in the group.

In addition, a learning DRNN voice model is provided to obtain a specified output that manifests the correctness in reacting to the voice data of some words. With the similar word discrimination apparatus, at the time of recognition processing, discrimination is made of similar words if there is a possibility of their being misrecognized on the basis of the obtained output from the DRNN for the input words using the DRNN voice model. It is provided with a DRNN sub voice model storage means that stores the learning DRNN sub-voice model to obtain the DRNN output that shows the correctness of a predetermined level and above. A word detection signal output means generates the DRNN output corresponding to the characteristic components of the input words using the DRNN sub-voice model, at the same time as outputting the DRNN output corresponding to the input word data using the DRNN voice model at the time of the vocal input of some words. A recognition processor is provided that, in the case where the DRNN output shows the correctness of a predetermined level or greater, establishes a specified period that includes the characteristic components of the words in the DRNN output. An examination is made of the DRNN output state by means of the DRNN sub-voice model relating to the input words during the specified period. Discrimination of the input words and the words that are similar to the input words is accomplished on the basis of the examination results.

Discrimination is accomplished of input words and words that are similar to the input words, in accordance with which the DRNN output becomes the value that shows the correctness of a predetermined level or greater by the DRNN sub voice model.

With the similar word discrimination apparatus that discriminates similar words using a DRNN sub-voice model, as described above, it is possible to discriminate similar words, that cannot be discriminated only by DRNN output, with high precision using the existing DRNN model in its existent state and without changing the learning method of the DRNN voice model. Furthermore, with this invention, since determination is made from the DRNN output using the DRNN voice model of only the characteristic components among the similar words, further high discrimination becomes possible, and it becomes possible to discriminate, with high precision, similar words that are easily misrecognized.

In addition, the DRNN voice model is a learning voice model that can be performed for a group of words having similar word groups by examining each similar word. In the respective similar word groups, the DRNN output shows the level of correctness of a predetermined level or greater for all of the words in the group.

An explanation has been provided with regard to three similar word group discrimination apparatus that differ from one another. However, with any of these similar word discrimination apparatus, the structure of the apparatus is not greatly complex. Further, with each apparatus, the similar words can be accurately discriminated with a simple process and without changing the learning method of the existing DRNN voice model. As for the DRNN voice model, by making it a learning voice model that can be performed for a group of words having similar word groups by examining each similar word, the DRNN output can be obtained that represents the correctness of a predetermined level or greater for all of the words in the group. At the time the similar words are made to be the recognition subject words, the necessity of creating a voice model for the similar words one by one disappears. Thus, it is also superior in terms of cost.

DETAILED DESCRIPTION OF PREFERRED EMBODIMENTS

An explanation of an embodiment of the invention is provided hereafter with reference to the drawings. Furthermore, in the state of execution, as the similar words that may be easily misrecognized, utilization is made of the Japanese words "nanji—what time is it" and "nando—what degree is it". An explanation is provided of an example in which recognition processing of those words is accomplished. Throughout the specification, Japanese words appear with their English translation. Since the invention is directed toward a method and apparatus for recognizing words through the recognition of sounds, the English translation has no effect on the functioning of the method and apparatus with regard to the examples provided herein.

It is appreciated that this invention can be used with respect to any language. For example, as long as the pre-existing database includes English words and the code book is based upon vowel sounds or other sounds associated with the English language, the method and apparatus described herein can be easily adapted for use by English speaking persons.

Figure 1:
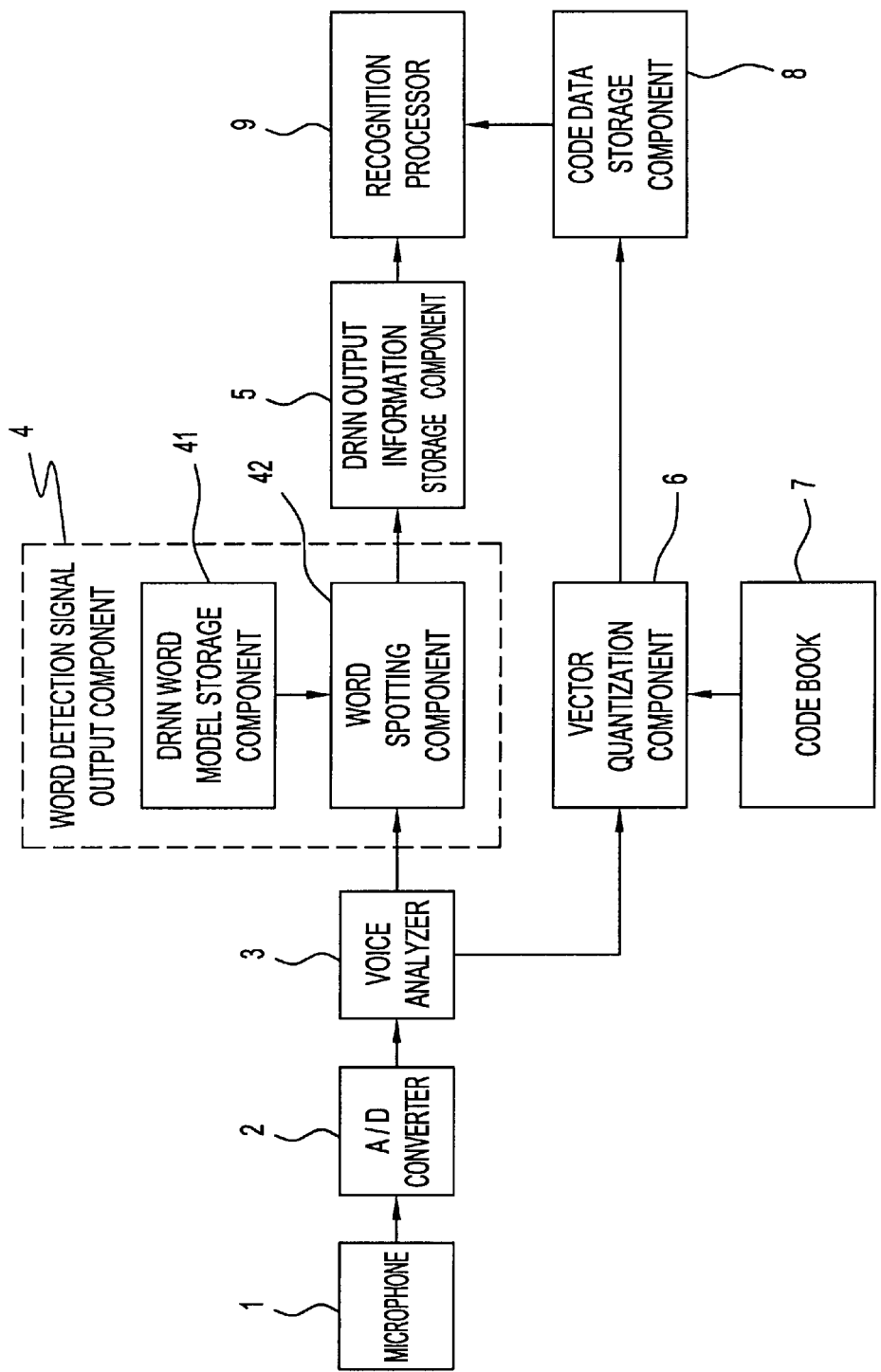
FIG. 1 is a block diagram of a similar word discrimination apparatus of a first embodiment of the present invention.

FIG. 1 is a block diagram that shows a word discrimination apparatus in accordance with a first embodiment of the invention, including a microphone 1 that serves as the voice input component, an A/D converter 2, a voice analyzer 3, a word detection signal output component 4, a DRNN output information storage component 5, a vector quantization component 6, a code book 7, a code data storage component 8, and a recognition processor 9.

After the voice is input to the microphone 1, it is converted to a digital signal by the A/D converter 2. The digital voice signal is then converted by means of a voice analyzer 3 into a characteristic vector series that is represented by a ten-dimensional LPC (cepstrum—phonetic) coefficient.

The word detection signal output component 4 includes a DRNN word model storage component 41 and a word spotting component 42. The DRNN word model storage component 41 is where the DRNN word model data for each recognition subject word is stored. For example, words such as "ohayo—good morning", "oyasumi—good evening", "nanji—what time", etc. are stored in the DRNN word model data storage component 41.

When the voice data from the voice analyzer 3 is input, the word spotting component 42 uses the contents of the DRNN word model storage component 41 to obtain the DRNN output for the key words, or recognition subject words. The DRNN output data includes the initial time of the DRNN output, the completion time, and the output value representing the level of correctness. The DRNN output data is stored in the DRNN output information storage component 5.

In the following embodiments, examples are made using the similar words "nanji—what time is it" and "nando—what degree is it". The examples also assume that a learning word model is provided for the word "nanji—what time is it". If a voice model of "nanji—what time is it" is input by a speaker, an output is obtained that has a high level of correctness. However, using the conventional word model, the same output is obtained when the voice data of "nando—what degree is it" is input by a speaker.

Therefore, the code book 7 is created from the five vowels of "ah (a), ee (i), oo (u), eh (e) and oh (o)". Thus, the code size of the code book is five.

The vector quantization component 6 uses the code book 7 to create vector quantized code data of the characteristic vector series of the voice analyzed input vocal sounds. The code data is stored in the code data storage component 8.

An explanation is now provided with regard to the specified processes accomplished by the apparatus previously described.

As indicated above, the DRNN word model storage component 41 stores the DRNN word models for each recognition subject word. If the speaker performing the input says "nanji—what time", the word spotting component 42 obtains a DRNN output (the DRNN output accomplished by the voice model of "nanji—what time") that has a correctness of a predetermined level or greater. Detection is accomplished of the initial time of the DRNN output, the completion time, and the output value representing the correctness. This data is stored in the DRNN output information storage component 5.

In the case where there is a DRNN output from the word spotting section 42 having a correctness of predetermined level or greater, the DRNN output is associated with the voice model of "nanji—what time". In some circumstances, even when the speakers giving this spoken input say "nando—what degree", a DRNN output that has a correctness of a predetermined level or greater is output from the word spotting section 42. As a result, data relating to the output values showing the initial time of the DRNN output, the completion time, and correctness are stored in the DRNN output information storage component 5.

Figure 2:
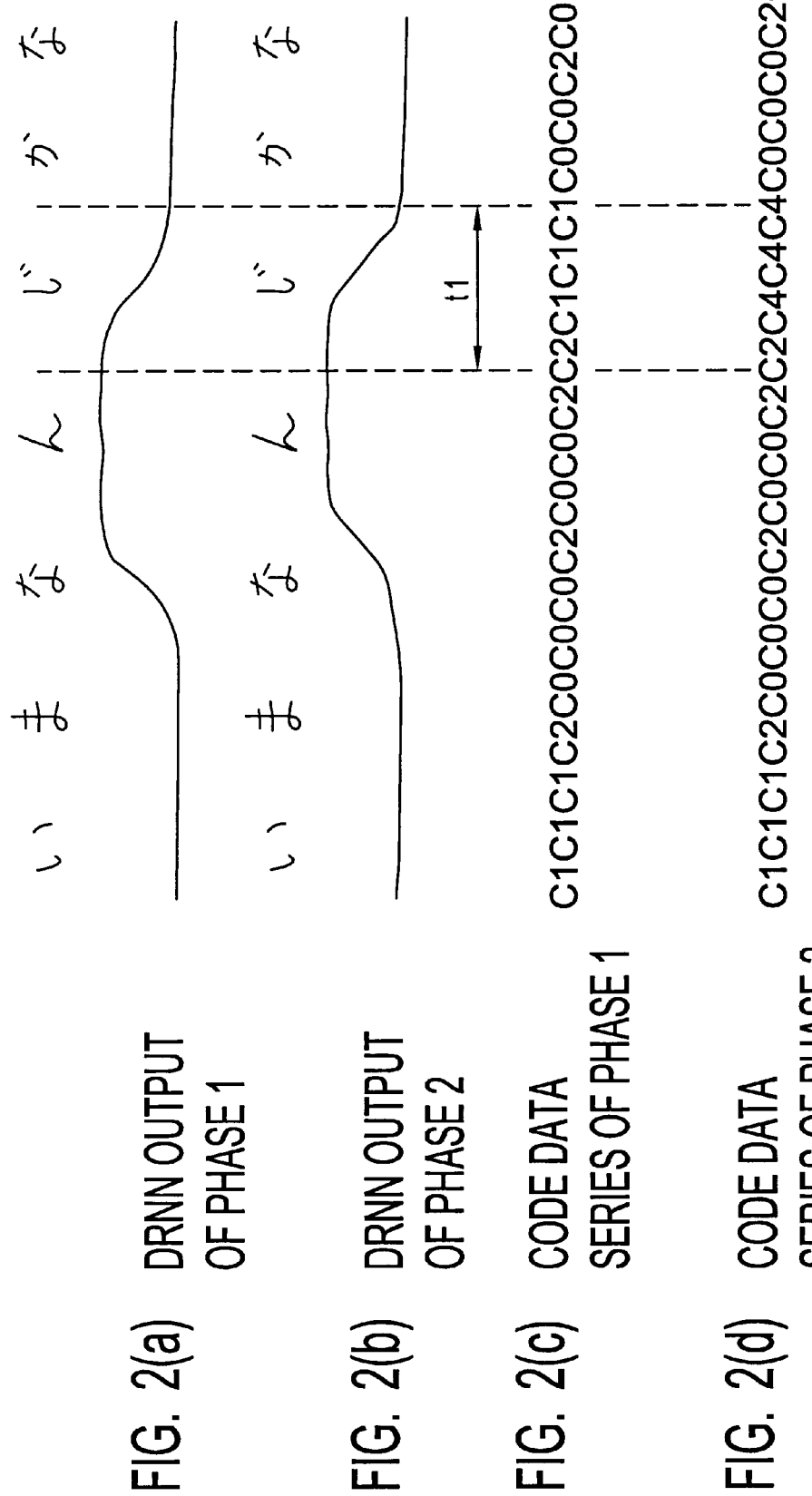
FIGS. 2(a)–2(d) show the discrimination process of the first embodiment of the invention.

As an example, FIG. 2(a) shows the DRNN output when "imananjikana—what time is it now" is said as the spoken input 1, and FIG. 2(b) shows the DRNN output when "imanandokana—what degree is it now" is the spoken input 2. In this example, the components "nanji—what time" and "nando—what degree" each produce a DRNN output that has a correctness of a predetermined level or greater.

Also, in the case where "imananjikana—what time is it now" is provided as the spoken input, then the voice data (characteristic vector series) is also applied to the vector quantization component 6. With the vector quantization component 6, utilization is made of the code book 7 created from the five vowels, and the voice data of "imananjikana—what time is it now" input by the speaker is vector quantized.

In other words, in code book 7, there exists five code vectors corresponding to the respective vowels of "a, i, u, e, and o". In other words, c0 exists for "a", c1 exists for "i", c2 exists for "u", c3 exists for "e", and c4 exists for "o". Computation is accomplished of the distance of each characteristic vector forming the characteristic vector series obtained from these code vectors "c0, c1, . . . c4", and the spoken input. By attaching correspondence with the code vectors of the minimum distance, encoded code data is obtained. An example of an encoded code series is shown in FIG. 2(c). As to be understood from FIG. 2(c), from among the vocal sound series of "imananjikana—what time is it now", for example "i" is the vocal sound of "i" of the vowels, and even in the component of "nanji—time", since the sound of the "i" of the vowels is present, the code data is such that c1 becomes the dominant data. Since there also exists the sounds of "ma", "na", "ka", and "na" comprising the "a" of the vowels, the code data is such that c0 is predominant.

In this manner, encoded code data is stored in the code data storage component 8. Also, by means of the recognition processor 9, a determination is made as to whether the words spoken by the speaker are "nanji—what time" or "nando—what degree", on the basis of the code data stored in the code data storage component 8, or on the basis of the DRNN output data stored in the DRNN output information storage component 5. An explanation regarding this determination process is provided hereafter.

As explained above, the data stored in the DRNN output information storage component 5 includes the output values that represent the initial time of the DRNN output, the completion time, and the correctness. On the basis of this data, a period t1 of the DRNN output is established corresponding to "nanji—what time". The period t1 distinguishes the DRNN output of the vocal sounds "ji—time" and "do—degree" to obtain the discrimination between "nanji—what time" and "nando—what degree". In other words, a period is established that includes the DRNN output for the characteristic components (in this instance "ji—time" and "do-degree" components) of the similar input words.

An examination then is made to determine which code vectors are included in the code data corresponding to the period t1 in the code data series shown in FIG. 2(c). In this case, the code vectors for the period t1 exist as c2, c1, c1, and c1. Since the code vector of "i" in the period t1 is present, the DRNN output shown by FIG. 2(a) is determined to be the DRNN output corresponding to "nanji—what time".

In the situation where the speaker says "imanandokana—what degree is it now" the DRNN output becomes substantially the same output as "nanji—what time". However, if the characteristic vector series of "imanandokana—what degree is it now" is encoded by the vector quantization component 6 using the code book 7, it becomes the code series shown in FIG. 2(d). As is shown in FIG. 2(d), the code vector in the period t1 contains c2, c4, c4, and c4.

Thus, since the code vector of "o" exists in the period t1, the DRNN output shown in FIG. 2(b) is determined to be the DRNN output for "nando—what degree".

With the first embodiment, as is described above, as the method for discriminating similar words, the input voice data is vector quantized using the code book created from the five vowels, thereby obtaining the code data. In order to accomplish discrimination of the input words, an examination is made to determine what kind of vowels are present during the specified period of the DRNN output. By this method, discrimination of similar words can be accomplished with high precision. This method is even effective for similar words that cannot be discriminated by using only the DRNN output.

Furthermore, with regard to the code book 7, described in the first embodiment, an example is provided in which the number of codes created from five vowels was five units. However, the number of codes of the code book 7 is not limited to five units. The utilization of a code book created from the five vowel sounds is beneficial from the point of the amount of processing. For example, utilization may also be made of a code book having a greater number of codes created from the vocal sounds that include consonants. If use were made of a code book that includes the characteristics of all sound elements for the example of "nanji—what time" and "nando—what degree", the vocal sound data of "ji—time" and "do—degree" is vector quantized using the code book, rather than only vowel sounds. By making a determination as to whether or not there is code data corresponding to "ji—time" and "do—degree" in the established period t1 of the DRNN output of "nanji—what time" and "nando—what degree", a determination can be made as to whether or not the vocally input words by the speaker are "nanji—what time" or "nando—what degree".

Using the method explained in the described first embodiment with over 200 speakers including adult males and adult females, a recognition ratio of approximately 95% was obtained. Furthermore, the code book utilized in this embodiment is a code book divided between men and women. Even from these experimental results, it is understood that discrimination could be accomplished with extremely high precision for similar words.

Figure 3:
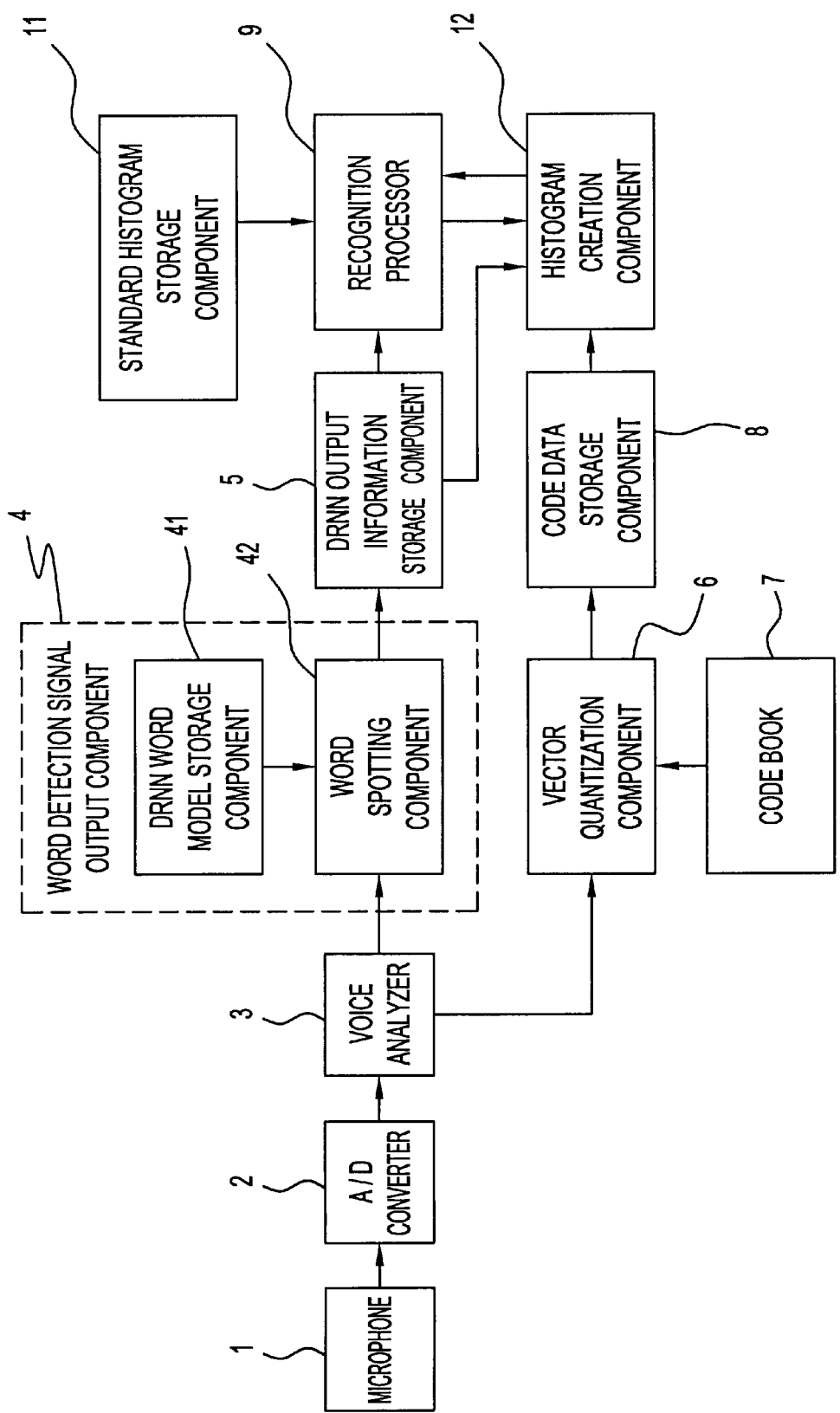
FIG. 3 is a block diagram of a similar word discrimination apparatus according to a second embodiment of the present invention.

Next, an explanation is provided of a second embodiment of the present invention. FIG. 3 is a block diagram of a similar word discrimination apparatus for performing the second embodiment. Differences from the first embodiment lie in the point of attachment of a standard histogram storage component 11 and a histogram creation component 12. Since the other components are essentially the same as those in FIG. 1, the same labels are applied to the same components. However, the code book 7 used in the second embodiment uses a code book that includes the characteristics of all sound elements. With the second embodiment, an example is provided utilizing a code book having 64 codes.

A standard histogram is stored in the standard histogram storage component 11. This standard histogram data is compiled based on the voice data obtained from the spoken words of several hundred speakers that is vector quantized using a code book having 64 codes. The histogram data shows how many times each code vector of the code book appears. This standard histogram data is precreated for words that are easily misrecognized.

Figure 4:
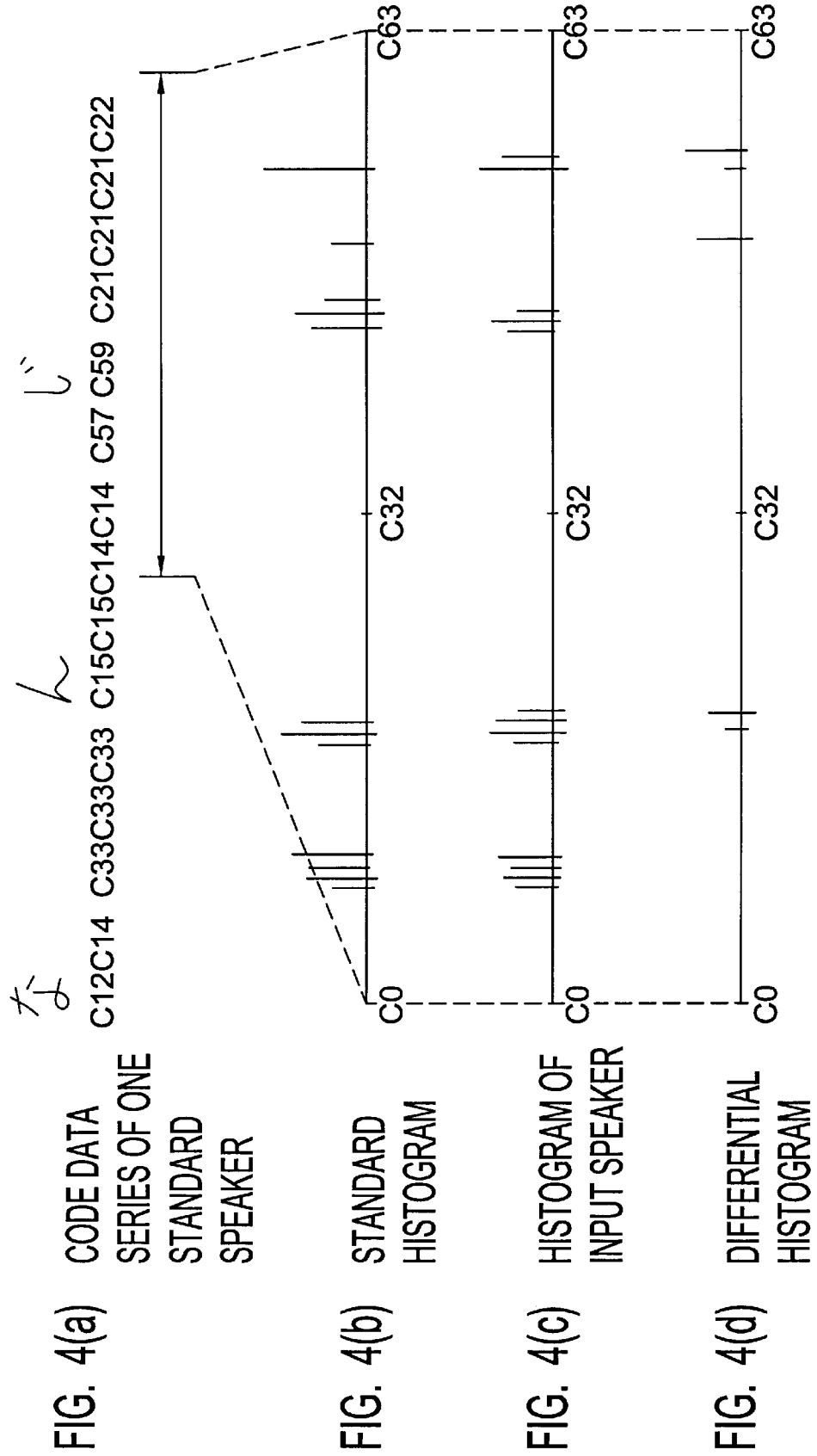
FIGS. 4(a)–4(d) show the discrimination process of the second embodiment of the invention.

FIG. 4(a) shows a code data example of when vector quantized data is obtained using a code book having 64 codes on data obtained from the speech of one individual for the words "nanji—what time". This code data is obtained person by person for a predetermined number of people (i.e., 200), thereby accumulating the representative number for each of the c0–c63 code vectors that are used to create a standard histogram.

As described above with respect to the first embodiment, some period t1 corresponding to the DRNN output is established. From the created standard histogram data, the standard histogram corresponding to the period t1 is stored in the standard histogram storage component 11. FIG. 4(b) shows an example of a standard histogram stored in a standard histogram storage component 11.

In other words, the standard histogram shown in FIG. 4(b) shows the cumulative number of appearances of code vectors obtained from several hundreds of speakers and the sound components relating to the period t1 of the DRNN output corresponding to "nanji—what".

In the same manner, even with respect to "nando—what degree" including the similar word "nanji—what time", creation is accomplished of a standard histogram of the code vector obtained from hundreds of speakers in the sound components relating to the period t1.

As described above, respective standard histograms are created for the components of the specified period t1 of the DRNN output of similar words (in this instance, "nanji—what time" and "nando—what degree"). This is stored in the standard histogram storage component 11.

When the user says "imananjikana—what time is it now", the vocal data (characteristic vector series), along with being processed by the word spotting component 42, is also processed by the vector quantization component 6. In the vector quantization component 6, the voice data of "imananjikana—what time is it now" of the user, is converted to code data that has been vector quantized using the code book having 64 codes. This code data is stored in the code data storage component 8.

If the creation of a histogram is determined to be necessary by the recognition processor 9, then the histogram is created for the person making the spoken input in the time period t1 that is obtained from the DRNN output information. In order to determine whether creation processing of a histogram is necessary, the processor 9 searches the contents of the DRNN output information storage component 5 for "nanji—what time" spoken by the user. In the event that a value that shows the correctness of a predetermined or greater level is output, it is determined that histogram creation processing is necessary.

The processor creates a histogram of the code vector of components corresponding to the period t1 of the DRNN output from among the code data relating to the voice data of "imananjikana—what time is it now" of the user, stored in the code data storage component 8. A histogram thus created is shown in FIG. 4(c). Also, the difference is obtained between the standard histogram and the histogram of the speaker making the input. However, the standard histogram is a histogram obtained from several hundred persons, and the histogram of the speaker making the input is a histogram obtained from the voice data of an individual. The difference is obtained by standardizing these histograms. This standardization process is not limited.

In addition to obtaining the differential histogram of the standard histogram relating to the standardized histogram input by the speaker, and "nanji—what time", and the differential histogram of the object, the differential histogram is obtained from the difference between the standard histogram relative to the histogram of the person making the spoken input and "nando—what degree". FIG. 4(d) shows the differential histogram as an absolute value of the standard histogram relative to the histogram input by the speaker for the word "nanji—what time", respectively. The cumulative frequency in the differential histogram obtained in this manner is added and calculated, thereby obtaining the total.

The processing described above is also accomplished in the standard histogram relating to the histogram input by the speaker and "nando—what degree", thereby obtaining the differential histogram of both, and obtaining a total that achieves the cumulative frequency of the differential histogram.

Selection is made of the smaller of the total values after comparing the respective total values. For example, if the total value of the cumulative frequency in the differential histogram obtained by the standard histogram for the histogram of the speaker making the input and "nanji—what time" is smaller than the total value in the differential histogram obtained by the standard histogram in relation to the histogram of the speaker making the input and "nando—what degree", the word spoken by the speaker making the input is determined to be "nanji—what time".

As indicated above, encoding is accomplished of the respective voice data obtained from the speech of several hundred individuals for similar words, and a standard histogram is created for each similar word on the basis of the code data. The differential histogram, the histogram of the person making the spoken input, and the standard histogram are obtained, and then discrimination of the input words is accomplished from the differential histogram. Even with regard to words for which discrimination could not be accomplished only by DRNN output, discrimination can be accurately accomplished of similar words without changing the learning method of the existing DRNN voice model.

In addition, since the process compares the number of distributions of code data of a specified period, that includes the characteristic components of words, with the number of distributions of the standard speakers, further discrimination becomes possible with a high degree of precision. Even with regard to similar words that are very easily misrecognized, discrimination is possible with high precision.

As a result of experiments performed with regard to "nando—what degree" and "nanji—what time" using some 200 male and female speakers, the method described in the second embodiment obtained a recognition ratio of close to 100%. In another embodiment, the code book used for males had 256 codes, and a standard histogram was created for male use, for female use, and for joint use, respectively. However, no matter which standard histogram was used, the same high recognition ratio was obtained.

Figure 5:
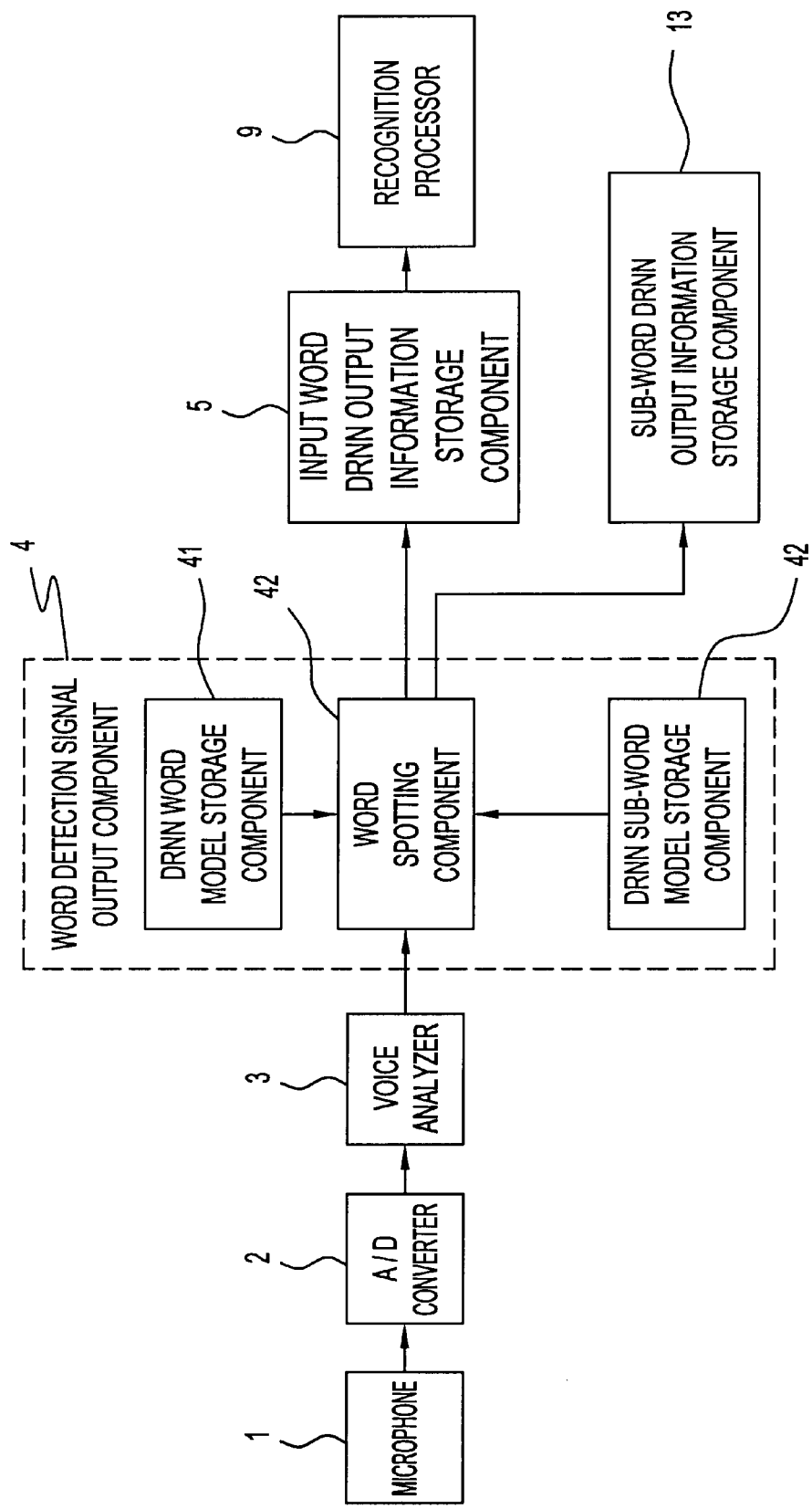
FIG. 5 is a block diagram of a similar word discrimination apparatus according to a third embodiment of the present invention.

Next, an explanation is provided regarding a third embodiment of the present invention. FIG. 5 is a block diagram of a discrimination apparatus according to the third embodiment of the invention. The apparatus includes a microphone 1 used for the voice input component, an A/D converter 2, a voice analysis component 3, a word detection signal output component 4, a DRNN output information storage component 4, a recognition processor 9, and a sub word DRNN output information storage component 13.

The word detection signal output component 4 according to the third embodiment is provided with the DRNN word model storage component 41 and the word spotting component 42 used in the first and second embodiments. The word detection signal output component 4 is also provided with a DRNN sub word model storage component 43. The DRNN sub word model storage component 43 stores the DRNN word model data of the characteristic components "ji—time" and "do—degree" respectively of "nanji—what time" and "nando—what degree" as similar words.

In addition, the sub—word DRNN output information storage component 13 stores the data that shows the DRNN output initial time, the completion time, and the correctness output at the time of the word spotting process, using the DRNN sub word model storage component 43. The DRNN output information storage component 5 that stores the DRNN output information of the input words is referred to hereafter as the input word DRNN output information storage component 5, in order to be distinguished from the sub—word DRNN output information storage component 13.

Hereafter, an explanation will be provided regarding a third embodiment of the invention. As in the previous embodiments, an explanation is provided of examples using "nanji—what time" and "nando—what degree" as the similar words.

Figure 6:
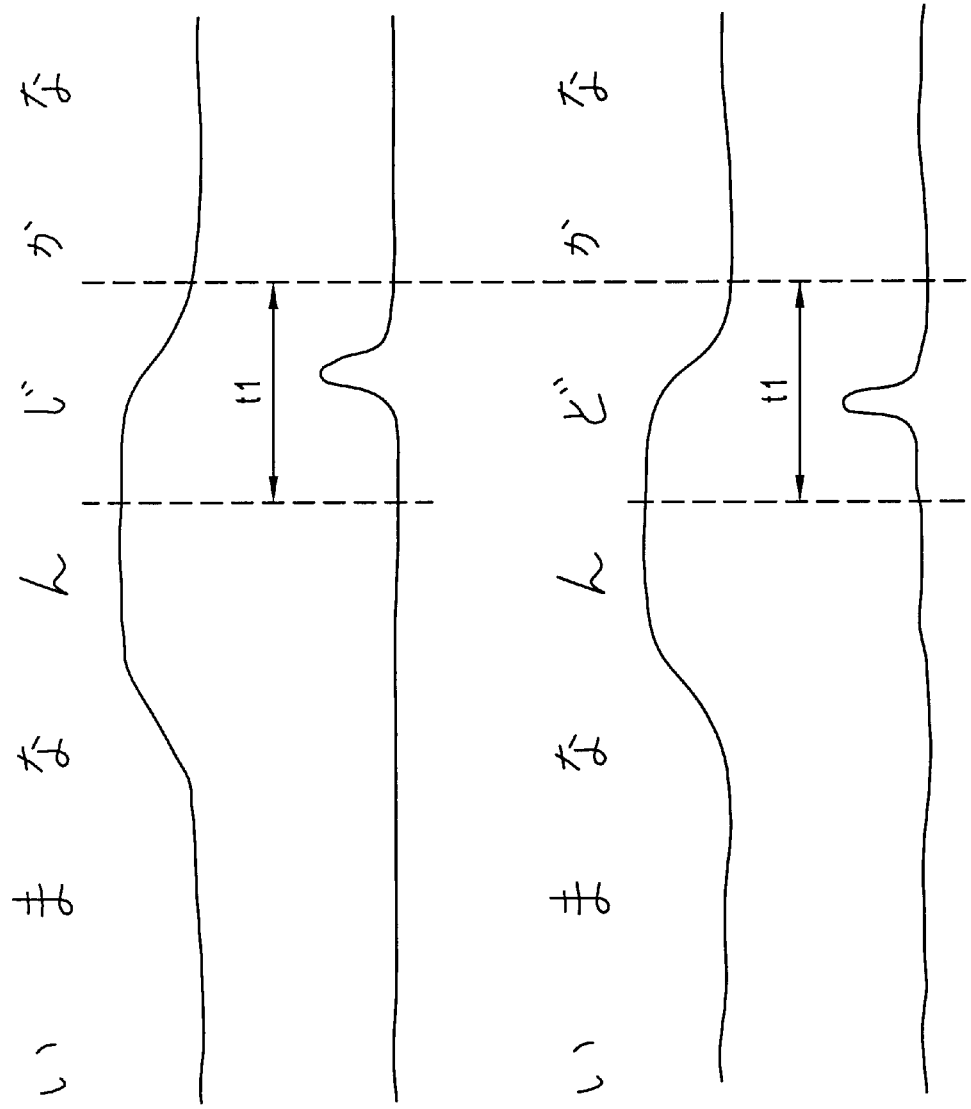
FIGS. 6(a)–6(d) show the discrimination process of the third embodiment of the invention.
Figure 7:
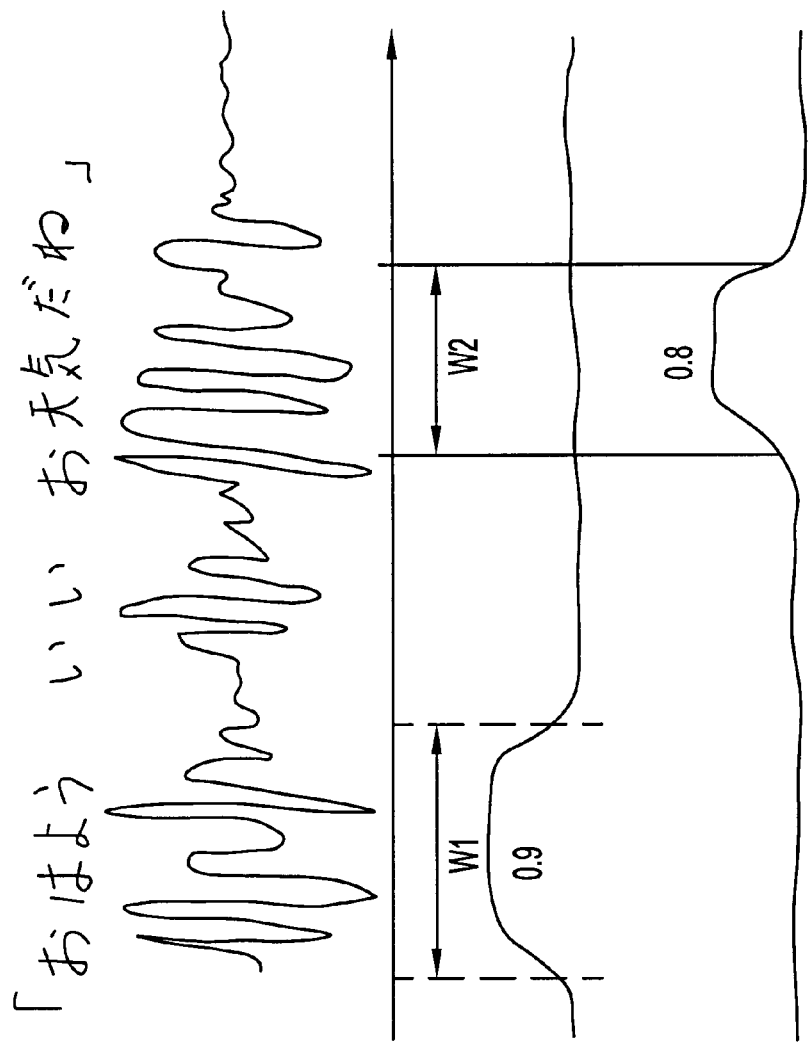
FIGS. 7(a)–7(c) shows the DRNN output at the time of word spotting processing using the DRNN word model.
Figure 8:
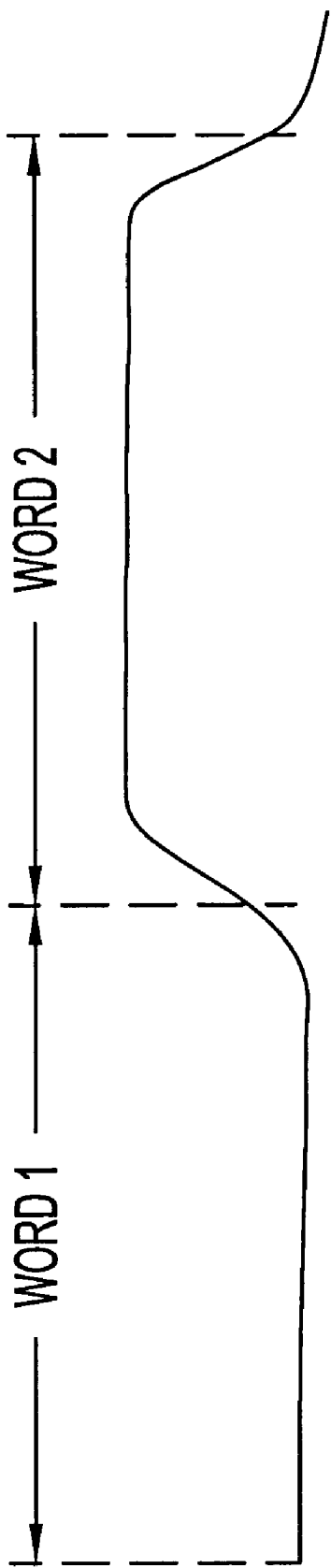
FIG. 8 shows the learning process that causes continuity in two words at the time of the learning DRNN word model.

When the speaker providing the input says "imananjikana—what time is it now", the voice is analyzed by the voice analyzer 3, output as a characteristic vector series, and processed by the word spotting component 42. The word spotting processing is accomplished using the contents of the DRNN word model storage component 41. From the word spotting component 42, a DRNN is output that contains the correctness of a predetermined or greater level. FIG. 6(a) shows the components of "nanji—what time". The data of the output values showing the initial time of the DRNN output, the completion time, and the correctness are stored in the input word DRNN output information storage component 5.

When the user says the words "imananjikana—what time is it now", the DRNN in the component of "nanji—what time" is output. At the same time, spotting 5 processing of the contents of the DRNN sub word model storage component 43 is accomplished for the sound component "ji—time". Then, the DRNN is output from the word spotting component 42 containing a correctness of a predetermined or higher level such as that shown in FIG. 6(b) by the component "ji—time". Also, the output values that show the initial time of the DRNN output, the completion time, and the correctness in the sound component "ji—time" are stored in the sub—word DRNN output information storage component 13.

If the DRNN output has a level of correctness of a predetermined level or higher for "nanji—what time", the recognition processor establishes the period t1 on the basis of the time information stored in the input word DRNN output information storage component 5, and an examination is made of the sub word DRNN output in the period t1. Based upon this examination, a determination is made as to what words were input. In other words, the recognition processor 9 recognizes the input words on the basis of the input word DRNN output information storage component 5 and the sub—word DRNN output information storage component 13. Specified processing is accomplished in the manner described hereafter.

The data such as the output values and the like that show the DRNN output initial time, the completion time, and the level of correctness for "ji—time" are entered in the sub—word DRNN output information storage component 13.

The recognition processor 9 is provided with a DRNN output that has correctness of a predetermined or greater level for "nanji—what time". If there is a sub word DRNN output that has a predetermined or greater level of correctness in the period t1, then the input voice is determined to be "nanji—what time".

On the other hand, if the speaker says the words "imanandokana—what degree is it now", a DRNN output having the correctness of a predetermined or greater level, such as that shown in FIG. 6(c), is output from the word spotting component 42. Also, the output values that show the initial time of the DRNN output, the completion time, and the correctness are detected, and each data is stored in the input word DRNN output information storage component 5.

Thus, when the user says the words "imanandokana—what degree is it now", the DRNN with the component of "nando—what degree" is output. However, the word spotting process is accomplished using the DRNN sub—word model with the sound component "do", and the DRNN output that has the correctness of a predetermined or greater level for the component "do" is obtained from the word spotting component 42, as shown in FIG. 6(d). Also, the output values that show the initial time of the DRNN output, the completion time, and the correctness of the sound component "do" is detected, and each detected data is stored in the sub word DRNN output information storage component 13.

Furthermore, the recognition processor 9 has a DRNN output that is provided with a correctness of a predetermined level or greater for "nando—what degree". If there is a sub—word DRNN output that has a predetermined or greater correctness in the period t1, a determination is made that the input voice is "nando—what degree".

Therefore, in the third embodiment, the DRNN the word model is obtained for one sound, "ji" or "do". In actual recognition, with one vocal sound DRNN word models there are many occasions in which output is accomplished even with regard to various sounds other than "ji" and "do". Problems will remain with regard to the current means for the DRNN word model for recognizing one sound itself. However, as described with respect to the third embodiment, if used as the sub word model, sufficient data can be obtained in actual use.

In the example provided with regard to "nanji—what time" and "nando—what degree", the DRNN sub word model is made to be the DRNN sub—word model of one sound corresponding to "ji" and "do". However, depending upon the similar characters, there are also cases in which the sub—word model of two sounds or more is used instead of the DRNN sub word model of one sound.

For example, if "nanji—what time" and "nannichi—what day" are made to be the similar words, preparation is made of a DRNN sub—word model of "ji" as the DRNN sub word model relating to "nanji—what time", and preparation is made of the DRNN sub word model of "nichi—day" with regard to "nannichi—what day". Similarly, correspondence can be made with various similar words.

Using the described third embodiment, discrimination of similar words can be accurately accomplished without changing the learning method of existing DRNN word model, even with regard to words for which discrimination cannot be accomplished only by the DRNN output. Discrimination is accomplished by the DRNN output for the sounds themselves of differing components from among the similar words themselves, therefore, further discrimination is possible with a high degree of precision.

As explained above, with voice recognition that uses the DRNN word model when similar words are input such as "nanji—what time" and "nando—what degree", the DRNN output is obtained for the vocal sound of both. However, according to the three above—described embodiments, discrimination of similar words can be accomplished with a high degree of precision by only adding a simple process and without changing the learning method of the DRNN word model used by the recognition apparatus.

Furthermore, the discrimination of similar words using embodiments other than those described above is possible. For example, discrimination can also be accomplished using the keyword spotting capable first and last end free-DP matching method, the HMM (Markoff-phonetic) method, the neural network method, and the like as general voice recognition technology. A brief explanation is provided hereafter with regard to a case in which utilization is made of the first and last end free—DP matching method. Even here, discrimination of the words "nanji—what time" and "nando—what degree" is accomplished.

Preparing the standard spoken characteristic data of the respective "nanji—what time" and "nando—what degree", the period t1 is established in the DRNN output of the components corresponding to the "nanji—what time" output by the "imananjikana—what time is it now" that is input by the speaker. In the period t1, the distance is obtained by taking the input voice characteristic data, the standard spoken characteristic data, and the dp matching. Discrimination can be accomplished of the input words from the distance. The discrimination method is such that the amount of processing is greater in comparison with the previously described embodiments. However, it is sufficiently possible for this invention to also be accomplished by this method.

In addition, with each of the embodiments, an explanation has been provided with examples in which the words "nanji—what time" and "nando—what degree" as the similar words for which misrecognition is easily accomplished. However, the similar words are not limited to these, of course, and it is also possible to discriminate among other similar words with the present invention.

In addition, as a group of similar words for which misrecognition is easily accomplished, for example when thinking of "nanji—what time", and "nando—what degree", then if the word model originally held by the voice recognition apparatus is made to be the word model of "nanji—what time", then when the DRNN is output of a predetermined or greater level in reaction to the "nando—what degree" and the word model, then through the accomplishment of the processing explained in each of the embodiments, for the "nanji—what time" that comprises the original recognition subject word, then it is natural that recognition can be accomplished with a high level of correctness, and it is also possible to add "nando—what degree" as the new recognition subject word in the voice recognition apparatus. This can also be said with respect to other similar word groups.

Furthermore, at the time of realizing the present invention, learning may also be applied wherein the DRNN is output of a predetermined or greater level in all of the similar words commencing from a first word model held by the recognition apparatus.

For example, with the example that is taken where "nanji—what time" and "nando—what degree" are used as similar words, then even with regard to "nanji—what time", the voice model put out by the DRNN output that is adequate for "nando—what degree" can be precreated, and the DRNN output can be positively output even if either of these similar words is input, and thereafter, determination can be made as to which word has the input, and the discrimination processing described in each of the embodiments can be performed.

According to this, when there are a number of similar words for which misrecognition can be easily accomplished among the recognition subject words, the need for a voice model for the respective similar words disappears, and it is also beneficial from a cost standpoint.

Furthermore, in this regard, creation is accomplished of a group of similar words. Even with regard to which words within the group, the word model for which the DRNN output is obtained having correctness of a predetermined level or greater can be created for each group.

For example, a group division is placed among the words for which misrecognition might easily occur. For example, similar word group A, such as "nanji—what time" and "nando—what degree", and similar word group B, such as "dengon—transmission", "denwa—telephone", "denki—electricity", etc. Also, output that possesses correctness of a predetermined level or greater in relation to the similar word group A and the like creates the learning DRNN word model A so it can be output. In addition. even with regard to the similar word group B words, creation is accomplished of the learning DRNN word model B so as to put out the output that has a correctness of a predetermined or greater level, and creation is accomplished of the word model corresponding to the respective groups. In the same manner, even with regard to other similar word groups, creation is accomplished of a word model corresponding to each group.

In this manner, creation is accomplished of a group of similar words, and even with regard to the words within the group, by holding a word model corresponding to each group so that the DRNN output of a predetermined or greater level can be obtained. For example in the case where the input "nanji—what time" is made, then the DRNN output is obtained that has a correctness of a predetermined or greater level, wherein the word model works in correspondence to it. Thereafter, if processing is accomplished as explained by each embodiment, the input vocal sound can accomplish the determination that it is "nanji—what time".

Accomplished in this manner, even when the similar words that are equally misrecognized from among the recognition subject words exist in great numbers, the necessity of having a word model of the respective similar words disappears, and it is also beneficial from a cost standpoint.

In addition, with the present invention, a similar word discrimination process explained in each of the embodiments may also be combined and used.

Furthermore, the process program for accomplishing the process of the present invention can be stored on a storage medium such as floppy disks, photo disks, and hard drives and the like. The present invention includes these storage media, and they have a format that obtains data from a network.

What is claimed is:

1. A similar word discrimination method for discriminating words that may be misrecognized because of their similarity, comprising the steps of:

receiving voice data of input words;

using a learning voice model to obtain a specified output that shows a level of correctness in response to the voice data of the input words;

processing the output to establish a specified period in which the characteristic components of the input words are included in the output, when the output shows a level of correctness of a predetermined amount or greater;

examining the characteristics of the voice data of said input words during the specified period; and discriminating between the input words and words that are similar to the input words on the basis of the examination.

2. A similar word discrimination method for discriminating words that may be misrecognized because of their similarity, comprising the steps of:

receiving voice data of input words;

using a learning dynamic recurrent neural networks (DRNN) voice model to obtain a specified DRNN output showing a level of correctness in response to the voice data of input words;

processing the DRNN output to establish a specified period in which the characteristic components of the input words are included in the DRNN output, when the DRNN output shows a level of correctness of a predetermined amount or greater;

encoding the input word voice data into code data by using a code book;

examining the characteristics of the code data of said input words during the specified period; and discriminating between the input words and words that are similar to the input words on the basis of the examination.

3. The similar word discrimination method of claim 2, wherein the steps of examining the characteristics of code data and discriminating between the input words and words that are similar to the input words further comprise:

examining the code data corresponding to vowel sounds from among the code data in the established specified period; and discriminating between the input words and words that are similar to the input words depending upon the vowel sounds from among the code data.

4. The similar word discrimination method of claim 2, further comprising the step of:

creating the code book from five vowel sounds.

5. The similar word discrimination method of claim 2, wherein:

the DRNN voice model creates correspondence between groups of words having similar word groups and generates a DRNN output showing the level of correctness at a predetermined level or greater for each of the similar word groups of the group of words.

6. A similar word discrimination method for discriminating words that may be misrecognized because of their similarity, comprising the steps of:

successively receiving voice data of input words from the speech of multiple speakers;

using a learning dynamic recurrent neural networks (DRNN) voice model to obtain a specified DRNN output showing a level of correctness in response to the voice data of each input word;

processing the DRNN output to establish a specified period in which the characteristic components of each input words are included in the DRNN output, when the DRNN output shows a level of correctness of a predetermined amount or greater;

encoding each input word voice data into code data by using a code book;

creating histogram data, including a code histogram, from the coded data that includes characteristics for the specified period of each input word;

accumulating standard histogram data by storing histogram data for each input word;

comparing the histogram data of each input word with the standard histogram data; and discriminating between the input words and words that are similar to the input words on the basis of the comparison.

7. The similar word discrimination method of claim 6, wherein the steps of comparing the histogram data of each input words with the standard histogram data and discriminating between the input words and words that are similar to the input words further comprise:

standardizing the respective histograms and calculating the differential between the respective histograms, and discriminating the input words and the words that are similar to the input words based on the size of the differential.

8. The similar word discrimination method of claim 6, wherein the DRNN voice model creates correspondence between groups of words having similar word groups and generates a DRNN output showing the level of correctness at a predetermined level or greater for each of the similar word groups of the group of words.

9. A similar word discrimination method for discriminating words that may be misrecognized because of their similarity, comprising the steps of:

receiving voice data of input words;

creating a learning dynamic recurrent neural networks (DRNN) sub-voice model, that uses a DRNN voice model, to obtain a specified DRNN output for the characteristic components of respective similar words showing a level of correctness in response to the voice data of input words;

processing the DRNN output to establish a specified period in which the characteristic components of the input words are included in the DRNN output, when the DRNN output shows a level of correctness of a predetermined amount or greater;

examining the characteristics of the voice data of said input words during the specified period; and discriminating between the input words and words that are similar to the input words on the basis of the examination.

10. The similar word discrimination method of claim 9, wherein:

the discrimination of the input words and the words that are similar to the input words is accomplished based on the value of the DRNN output which shows the level of correctness above a specified level in accordance with the DRNN sub-voice model.

11. The similar word discrimination method of claim 9 wherein:

the DRNN voice model creates correspondence between groups of words having similar word groups and generates a DRNN output showing the level of correctness at a predetermined level or greater for each of the similar word groups of the group of words.

12. A similar word discrimination apparatus for discriminating words that may be misrecognized because of their similarity having a learning voice model that performs recognition processing to obtain specified output showing a level of correctness in response to voice data of input words, comprising:

a word detection signal output means that outputs the level of correctness above a predetermined level by means of the voice model that reacts to the vocal data of the input words, when there is vocal input of some words; and a processing means that, when the word detection signal output means generates an output showing a level of correctness above a predetermined level, establishes a specified period that includes characteristic components of the vocal data of the input words, examines the characteristics of the vocal data of the input words during the specified period, and performs discrimination of the input words and the words that are similar to the input words on the basis of the examination results.

13. A similar word discrimination apparatus for discriminating words that may be misrecognized because of their similarity having a learning dynamic recurrent neural networks (DRNN) voice model that performs recognition processing to obtain specified output showing a level of correctness in response to voice data of input words, comprising:

a word detection signal output means that generates a DRNN output corresponding to the input word vocal data using the DRNN voice model, at the time of the vocal input of some words; and a codification means that codifies the input word vocal data using a code book; and a processing means that, when the word detection signal output means generates a DRNN output showing a level of correctness above a predetermined level, establishes a specified period that includes characteristic components of the vocal data of the input words, examines the data encoded by the codification means during the specified period, and performs discrimination of the input words and words that are similar to the input words on the basis of the examination results.

14. The similar word discrimination apparatus of claim 13, wherein:

the code data is examined for vowel sounds among the code data during the specified period, and processing is performed that discriminates among the input words and the words that are similar to the input words on the basis of the examination results.

15. The similar word discrimination apparatus of claim 13, wherein:

the code book is created from five vowels.

16. The similar word discrimination apparatus of claims 13, wherein:

the DRNN voice model creates correspondence between groups of words having similar word groups and generates a DRNN output showing the level of correctness at a predetermined level or greater for each of the similar word groups of the group of words.

17. A similar word discrimination apparatus for discriminating words that may be misrecognized because of their similarity having a learning dynamic recurrent neural networks (DRNN) voice model that performs recognition processing to obtain specified output showing a level of correctness in response to voice data of input words, comprising:

a word detection signal output means that generates a DRNN output corresponding to the input word vocal data using the DRNN voice model, at the time of the vocal input of some words; and a codification means that codifies the input word vocal data using a code book;

a standard histogram storage means that preserves the histogram data created for each word from the code data during a specified period as standard histogram data, the histogram data includes the characteristic components of the respective similar words from among the code data obtained from the speech of multiple speakers for the respective similar words; and a processing means that, when the word detection signal output means generates a DRNN output showing a level of correctness above a predetermined level, establishes the specified period that includes characteristic components of the vocal data of the input words, creates a code histogram for the specified period using code data encoded by the codification means during the specified period, and performs discrimination of the input words and words that are similar to the input words by comparing the histogram data for each word with the standard histogram data.

18. The similar word discrimination apparatus of claim 17, wherein:

the histogram data and the standard histogram data are standardized, a comparison is made between the histogram data created from the input words and the standard histogram data, the differential between the respective histogram data is computed, and discrimination of the input words and the words that are similar to the input words is made based on the size of the differential.

19. The similar word discrimination apparatus of claim 17, wherein:

the DRNN voice model creates correspondence between groups of words having similar word groups and generates a DRNN output showing the level of correctness at a predetermined level or greater for each of the similar word groups of the group of words.

20. A similar word discrimination apparatus for discriminating words that may be misrecognized because of their similarity having a learning dynamic recurrent neural networks (DRNN) voice model that performs recognition processing to obtain specified output showing a level of correctness in response to voice data of input words, comprising:

a DRNN sub-voice storage means for storing a learning DRNN sub-voice model that generates DRNN output showing a level of correctness for characteristic components of the respective similar words that may be misrecognized;

a word detection signal output means that outputs the level of correctness at a predetermined level or greater from the DRNN voice model and from the DRNN sub-voice model in response to the voice data of the input words, when there is vocal input of some words; and a processing means that, when the word detection signal output means generates a DRNN output showing a level of correctness above a predetennined level, establishes a specified period that includes characteristic components of the vocal data of the input words, uses the DRNN sub-voice model to examine the DRNN output characteristics of the vocal data of the input words during the specified period, and performs discrimination of the input words and the words that are similar to the input words on the basis of the examination results.

21. The similar word discrimination apparatus of claim 20, wherein:

the DRNN output is examined by the DRNN sub-voice model relating to the input words during the specified period, and on the basis of the examination results, the process for accomplishing discrimination of the input words and words that are similar to the input words by the DRNN sub-voice model compares the DRNN output to determine which value shows the level of correctness of a predetermined level or greater.

22. The similar word discrimination apparatus of claim 20, wherein:

the DRNN voice model creates correspondence between groups of words having similar word groups and generates a DRNN output showing the level of correctness at a predetermined level or greater for each of the similar word groups of the group of words.

23. A similar word discrimination apparatus, comprising:

means for receiving voice data of input words;

means for using a learning voice model to obtain a specified output that shows a level of correctness in response to the voice data of the input words;

means for processing the output to establish a specified period in which the characteristic components of the input words are included in the output, when the output shows a level of correctness of a predetermined amount or greater;

means for examining the characteristics of the voice data of said input words during the specified period; and means for discriminating between the input words and words that arc similar to the input words on the basis of the examination.

24. A similar word discrimination apparatus, comprising:

means for receiving voice data of input words;

means for using a learning dynamic recurrent neural networks (DRNN) voice model to obtain a specified DRNN output showing a level of correctness in response to the voice data of input words;

means for processing the DRNN output to establish a specified period in which the characteristic components of the input words are included in the DRNN output, when the DRNN output shows a level of correctness of a predetermined amount or greater;

means for encoding the input word voice data into code data by using a code book;

means for examining the characteristics of the code data of said input words during the specified period; and means for discriminating between the input words and words that are similar to the input words on the basis of the examination.

25. The similar word discrimination apparatus of claim 24, further comprising:

means for examining the code data corresponding to vowel sounds from among the code data in the established specified period; and means for discriminating between the input words and words that are similar to the input words depending upon the vowel sounds from among the code data.

26. The similar word discrimination apparatus of claim 24, further comprising:

means for creating the code book from five vowel sounds.

27. The similar word discrimination apparatus of claims 24, wherein:

the DRNN voice model creates correspondence between groups of words having similar word groups and generates a DRNN output showing the level of correctness at a predetermined level or greater for each of the similar word groups of the group of words.

28. A similar word discrimination apparatus, comprising:

means for successively receiving voice data of input words from the speech of multiple speakers;

means for using a learning dynamic recurrent neural networks (DRNN) voice model to obtain a specified DRNN output showing a level of correctness in response to the voice data of each input word;

means for processing the DRNN output to establish a specified period in which the characteristic components of each input words are included in the DRNN output, when the DRNN output shows a level of correctness of a predetermined amount or greater;

means for encoding each input word voice data into code data by using a code book;

means for creating histogram data, including a code histogram, from the coded data that includes characteristics for the specified period of each input word;

means for accumulating standard histogram data by storing histogram data for each input word;

means for comparing the histogram data of each input word with the standard histogram data; and means for discriminating between the input words and words that are similar to the input words on the basis of the comparison.

29. The similar word discrimination apparatus of claim 28, further comprising:

means for standardizing the respective histograms and calculating the differential between the respective histograms, and means for discriminating the input words and the words that are similar to the input words based on the size of the differential.

30. The similar word discrimination apparatus of claim 28, wherein the DRNN voice model creates correspondence between groups of words having similar word groups and generates a DRNN output showing the level of correctness at a predetermined level or greater for each of the similar word groups of the group of words.

31. A similar word discrimination apparatus, comprising:

means for receiving voice data of input words;

means for creating a learning dynamic recurrent neural networks (DRNN) sub-voice model, that uses a DRNN voice model, to obtain a specified DRNN output for the characteristic components of respective similar words showing a level of correctness in response to the voice data of input words;

means for processing the DRNN output to establish a specified period in which the characteristic components of the input words are included in the DRNN output, when the DRNN output shows a level of correctness of a predetermined amount or greater;

means for examining the characteristics of the voice data of said input words during the specified period; and means for discriminating between the input words and words that are similar to the input words on the basis of the examination.

32. The similar word discrimination apparatus of claim 31, wherein:

the discrimination of the input words and the words that are similar to the input words is accomplished based on the value of the DRNN output that shows the level of correctness above a predetermined level in accordance with the DRNN sub-voice model.

33. The similar word discrimination apparatus of claim 31, wherein:

the DRNN voice model creates correspondence between groups of words having similar word groups and generates a DRNN output showing the level of correctness at a predetermined level or greater for each of the similar word groups of the group of words.

* * * * *